United States Patent
Kashiwagi

(10) Patent No.: US 10,530,113 B2
(45) Date of Patent: Jan. 7, 2020

(54) FIBER LASER APPARATUS AND METHOD OF MANUFACTURING AMPLIFYING COIL

(71) Applicant: Fujikura Ltd., Tokyo (JP)

(72) Inventor: Masahiro Kashiwagi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/444,548

(22) Filed: Feb. 28, 2017

(65) Prior Publication Data

US 2017/0170622 A1 Jun. 15, 2017

Related U.S. Application Data

(63) Continuation of application No. PCT/JP2016/053014, filed on Feb. 2, 2016.

(30) Foreign Application Priority Data

Feb. 12, 2015 (JP) .................................. 2015-025184

(51) Int. Cl.
*H01S 3/30* (2006.01)
*H01S 3/067* (2006.01)
(Continued)

(52) U.S. Cl.
CPC ............ *H01S 3/06729* (2013.01); *G02B 6/02* (2013.01); *H01S 3/04* (2013.01); *H01S 3/042* (2013.01);
(Continued)

(58) Field of Classification Search
CPC .. H01S 3/06729; H01S 3/04; H01S 3/094003; H01S 3/09415; H01S 3/067;
(Continued)

(56) References Cited

U.S. PATENT DOCUMENTS 4,552,433 A * 11/1985 Titchmarsh .............. D07B 3/06
385/107
5,949,941 A * 9/1999 DiGiovanni ....... G02B 6/03622
359/345
(Continued)

FOREIGN PATENT DOCUMENTS

CN 101453097 A 6/2009
CN 101854020 A 10/2010
(Continued)

OTHER PUBLICATIONS

Notice of Allowance dated Apr. 4, 2017, issued in counterpart Japanese Application No. 2015-025184. (3 pages).
(Continued)

*Primary Examiner* — Jessica S Manno
*Assistant Examiner* — Delma R. Fordé
(74) *Attorney, Agent, or Firm* — Westerman, Hattori, Daniels & Adrian, LLP

(57) ABSTRACT

A fiber laser apparatus includes a pumping light source which launches pumping light, an amplifying optical fiber which includes a core and a noncircular cladding, and absorbs the pumping light to launch laser light, an amplifying coil which has a configuration around which the amplifying optical fiber is wound, a first reflector which is provided on an input side of the amplifying coil and is configured to reflect the laser light toward the amplifying coil, and a second reflector which is provided on a launching side of the amplifying coil, has a lower reflectance than a reflectance of the first reflector, and is configured to reflect the laser light toward the amplifying coil.

7 Claims, 9 Drawing Sheets

(51) Int. Cl.
*G02B 6/02* (2006.01)
*H01S 3/042* (2006.01)
*H01S 3/04* (2006.01)
*H01S 3/094* (2006.01)
*G02B 6/46* (2006.01)
*H01S 3/0941* (2006.01)
*G02B 6/44* (2006.01)

(52) U.S. Cl.
CPC ...... *H01S 3/06704* (2013.01); *H01S 3/06733* (2013.01); *H01S 3/094003* (2013.01); *G02B 6/449* (2013.01); *G02B 6/4457* (2013.01); *G02B 6/46* (2013.01); *H01S 3/0675* (2013.01); *H01S 3/09415* (2013.01); *H01S 3/094007* (2013.01)

(58) Field of Classification Search
CPC ............. H01S 3/06708; H01S 3/06733; H01S 3/06745; H01S 3/06754; H01S 3/06762; H01S 3/06791; H01S 3/094007; H01S 3/094015; H01S 3/0407; H01S 3/09; H01S 3/094042; H01S 3/094053; H01S 3/094061; H01S 3/0941; H01S 3/06737; H01S 5/1071; H01S 5/0421; H01S 5/147; H01S 5/02284; G02B 6/2934; G02B 6/0006; G02B 6/001; G02B 6/005; G02B 6/0055; G02B 6/29338; G02B 6/4214; G02B 6/0031; G02B 6/3814; G02B 6/4296; G02B 6/4298; G02B 6/02; G02B 6/02342; G02B 6/02371; G02B 6/0073; G02B 6/0066; G02B 2006/12104; G02B 2006/12147; G02F 1/0063; G02F 1/0118; A61B 1/0017; A61B 2018/2205; A61B 2018/2244; A61B 2018/2272; A61B 2018/2277; C03C 13/04

See application file for complete search history.

(56) References Cited

U.S. PATENT DOCUMENTS

| | | | | |
|---|---|---|---|---|
| 6,384,919 B1* | 5/2002 | Fersht | ............... | G01H 9/004 356/477 |
| 6,459,068 B1* | 10/2002 | Yamaura | ............ | B23K 26/0604 219/121.6 |
| 6,798,792 B2* | 9/2004 | Itoh | ................. | H01S 3/067 372/39 |
| 6,826,335 B1* | 11/2004 | Grudinin | ............... | B82Y 20/00 359/341.3 |
| 7,457,327 B2* | 11/2008 | Nakano | ............... | H01S 3/06704 372/6 |
| 8,306,073 B2* | 11/2012 | Kitabayashi | ......... | H01S 3/06754 359/341.1 |
| 8,958,074 B1* | 2/2015 | Xu | .................. | G01C 19/722 356/465 |
| 2002/0001320 A1* | 1/2002 | Itoh | ................. | H01S 3/067 372/6 |
| 2002/0057880 A1* | 5/2002 | Hirano | ............. | C03B 37/01211 385/127 |
| 2002/0172236 A1* | 11/2002 | Sekiguchi | ......... | H01S 3/094003 372/6 |
| 2003/0142938 A1* | 7/2003 | Koyano | ............... | G02B 6/4457 385/123 |
| 2004/0256180 A1* | 12/2004 | Eichhorn | ............... | B66B 15/04 187/254 |
| 2005/0024716 A1* | 2/2005 | Nilsson | ............ | H01S 3/094003 359/341.31 |
| 2006/0078009 A1 | 4/2006 | Katayama et al. | | |
| 2007/0280597 A1* | 12/2007 | Nakai | .................. | G02B 6/2835 385/43 |
| 2008/0095199 A1* | 4/2008 | Abramczyk | ........... | G02B 6/105 372/6 |
| 2008/0130010 A1* | 6/2008 | Williams | ............... | B65H 54/10 356/465 |
| 2008/0212621 A1* | 9/2008 | Furuya | .................... | H01S 3/042 372/6 |
| 2009/0129411 A1 | 5/2009 | Kojima et al. | | |
| 2009/0154882 A1* | 6/2009 | Salokatve | ............ | G02B 6/2835 385/50 |
| 2009/0262416 A1* | 10/2009 | Lancaster | ......... | H01S 3/094003 359/341.1 |
| 2010/0067860 A1* | 3/2010 | Ikeda | ................. | G02B 6/03633 385/127 |
| 2010/0079855 A1* | 4/2010 | Dong | .................... | C03C 25/104 359/341.3 |
| 2010/0157418 A1* | 6/2010 | Dong | ................. | G02B 6/02009 359/341.3 |
| 2010/0247055 A1* | 9/2010 | Arashitani | .......... | H01S 3/06704 385/137 |
| 2010/0284060 A1 | 11/2010 | Nicholson | | |
| 2011/0081123 A1* | 4/2011 | Pare | .................. | G02B 6/03661 385/124 |
| 2012/0219261 A1 | 8/2012 | Sasaki et al. | | |
| 2012/0230352 A1* | 9/2012 | Minelly | .................. | H01S 3/042 372/6 |
| 2013/0235449 A1* | 9/2013 | Suzuki | .................. | H01S 3/0405 359/341.1 |
| 2014/0212103 A1* | 7/2014 | Taunay | ............ | B29D 11/00682 385/127 |
| 2015/0293300 A1* | 10/2015 | Fini | ...................... | G02B 6/0285 385/124 |
| 2015/0331209 A1* | 11/2015 | Pikulski | ............... | G02B 6/3608 385/14 |

FOREIGN PATENT DOCUMENTS

| | | | | |
|---|---|---|---|---|
| EP | 0438082 A | * | 1/1991 | ............... G02B 6/44 |
| JP | 2001-13346 A | | 1/2001 | |
| JP | 2005-200277 A | | 7/2005 | |
| JP | 2006-93613 A | | 4/2006 | |
| JP | 2006-114769 A | | 4/2006 | |
| JP | 2007-273600 A | | 10/2007 | |

OTHER PUBLICATIONS

Notification of Reason for Refusal dated Oct. 4, 2016, issued in counterpart Japanese Patent Application No. 2015-025184 (3 pages).
Extended (supplementary) European Search Report dated Jul. 11, 2018, issued in counterpart European Application No. 16749091.1. (8 pages).
Office Action dated Aug. 15, 2018, issued in counterpart Chinese Application No. 201680002392.2. (6 pages).

* cited by examiner

FIBER LASER APPARATUS AND METHOD OF MANUFACTURING AMPLIFYING COIL

CROSS-REFERENCE TO RELATED APPLICATION

This is a Continuation Application of International Application No. PCT/JP2016/053014, filed on Feb. 2, 2016, which claims priority to Japanese Patent Application No. 2015-025184, filed on Feb. 12, 2015. The contents of the aforementioned applications are incorporated herein by reference.

BACKGROUND OF THE INVENTION

Field of the Invention

The present invention relates to a fiber laser apparatus and a method of manufacturing an amplifying coil.

Description of the Related Art

In recent fiber laser apparatuses, output light power exceeding 1 kW can be achieved by increasing luminance of a pumped semiconductor laser or commercializing the amplifying double clad fiber. Conventionally, such a high output fiber laser can be applied to the field of material processing, in which carbon dioxide laser has been mainly used. The fiber laser has better bears quality and light condensing performance than the carbon dioxide laser. For this reason, in the high output fiber laser, since processing time can be shortened, throughput is improved, and since processing characteristics equivalent to high power even at low power can be realized, energy saving is improved. In addition, since spatial optical components are unnecessary, there are also advantages that durability is provided, problems with respect to alignment of optical components or the like do not occur, and maintenance is unnecessary.

A case where a double clad fiber having a first cladding (inner cladding) and a second cladding (outer cladding) is adopted as an amplifying optical fiber is assumed.

For example, if a cross-sectional shape of the first cladding has a shape having rotational symmetry such as a regular hexagon shape, light propagating in the first cladding spirally travels while being entirely reflected at a constant angle at an interface between the first cladding and the second cladding. In this way, pumping light which is once deviated from a core travels in the first cladding without changing the incident angle (reflection angle) with respect to the interface. Therefore, this pumping light does not reach the core no matter how many times it is reflected. Accordingly, the light substantially contributing as the pumping light is only a portion of the light that is launched into the amplifying optical fiber, and there is a problem that utilization efficiency of the pumping light is low.

In order to solve this problem, Japanese Unexamined Patent Application, First Publication No, 2001-13346 (hereinafter, referred to as Patent Document 1) below discloses an optical amplifier in which a first cladding has two or more linear reflecting surfaces, and which includes a double clad fiber in which directions of the reflecting surfaces with respect to a core are different from each other at an arbitrary location in a light propagation direction.

For example, in order to obtain the double clad fiber in which the directions of the reflecting surfaces are different from each other at an arbitrary location in the light propagation direction, Patent Document 1 discloses that the double clad fiber may be fixed to a system in a twisted state. However, it may be difficult to fix an optical fiber in a twisted state to a portion of the apparatus by a fixing jig or the like, for example and to further maintain the twisted state of the optical fiber. In addition, in a pre-step in which the optical fiber is wound in a coil shape, and thereafter, the optical fiber is fixed to the apparatus, a trouble such as dispersion of the wound optical fiber may occur. Therefore, there is a problem that handling with the coil alone is difficult.

SUMMARY OF THE INVENTION

An aspect of the invention is to solve the problems, and an object thereof is to provide a fiber laser apparatus having an amplifying coil which can sufficiently maintain a twisted state of an optical fiber and can be easily handled. In addition, an object of another aspect of the invention is to provide a method of easily manufacturing an amplifying coil which can sufficiently maintain a twisted state of an optical fiber and can be easily handled.

In order to achieve the objects, according to a first aspect of the invention, a fiber laser apparatus includes: a pumping light source which launches pumping light; an amplifying optical fiber which includes a core and a noncircular cladding, and absorbs the pumping tight to launch laser light; an amplifying coil which has a configuration around which the amplifying optical fiber is wound; a first reflector which is provided on an input side of the amplifying coil and is configured to reflect the laser light toward the amplifying coil; and a second reflector which is provided on a launching side of the amplifying coil, has a lower reflectance than a reflectance of the first reflector, and is configured to reflect the laser light toward the amplifying coil. In addition, in the amplifying coil, the amplifying optical fiber is wound with a center axis of the amplifying optical fiber as a center in a state of being twisted in a peripheral direction of the amplifying optical fiber, and the wound amplifying optical fiber is fixed and integrated.

In the fiber laser apparatus of the aspect, since the amplifying optical fiber is wound with the center axis of the amplifying optical fiber as a center in the state of being twisted in the peripheral direction and the wound amplifying optical fiber is fixed and integrated with each other, it is possible to sufficiently maintain the twisted state of the fiber. Accordingly, it is possible to increase utilization efficiency of the pumping light and to increase an output light amount. In addition, handling with the amplifying coil alone becomes easy.

In the amplifying coil, a portion between adjacent amplifying optical fibers may be filled with a resin.

According to this configuration, it is possible to fix and integrate the wound amplifying optical fibers to each other by the resin without using other fixing members.

The fiber laser apparatus may further include a cooling member which cools the amplifying coil.

According to this configuration, in a case Where the amplifying coil comes into contact with the cooling member to cool the amplifying coil, for example, since the surface of the amplifying coil is flattened by the resin, a contact area between the amplifying coil and the cooling member increases. Accordingly, it is possible to increase cooling efficiency of the amplifying coil.

A twist amount of the amplifying optical fiber may gradually increase in a direction from the first reflector side toward the second reflector side.

In the specification, the "twist amount of the amplifying optical fiber" defines as a "number of turns of the amplifying optical fiber per unit length of the amplifying optical fiber".

In general, in the amplifying optical fiber, the pumping light is mainly absorbed by the core on an input side (first reflector side), and a skew light component gradually increases in a direction toward a launching side (the second reflector side). Therefore, according to the configuration, since the twist amount of the amplifying optical fiber gradually increases in the direction from the first reflector side toward the second reflector side, the skew light component is easily absorbed by the core on the launching side. Accordingly, it is possible to prevent the deterioration of beam quality of the amplifying optical fiber while decreasing local heat generation and to increase the utilization efficiency of the pumping light.

The twist amount of the amplifying optical fiber may be 3 turns/m or less.

According to this configuration, it is possible to decrease an increase amount of $M^2$, which is one of indexes of the beam quality, to 0.01 or less. The grounds will be described later.

According to a second aspect of the invention, a method of manufacturing an amplifying coil includes; winding an amplifying optical fiber in a coil shape while lowering a portion of the amplifying optical fiber onto one surface of a base; and filling a portion between adjacent amplifying optical fibers with a resin to fix the amplifying optical fibers to each other.

According to this configuration, if the amplifying optical fiber is wound in a coil shape while a portion of the amplifying optical fiber is lowered onto the base, the amplifying optical fiber is naturally twisted. Thereafter, the wound amplifying optical fibers are fixed to each other by resin and are integrated. Accordingly, it is possible to easily manufacture the amplifying coil.

According to a third aspect of the invention, a method of manufacturing an amplifying coil, includes: winding the amplifying optical fiber drawn out from a bobbin around a rotary jig to wind the amplifying optical fiber in a coil shape; and filling a portion between adjacent amplifying optical fibers with a resin to fix the amplifying optical fibers to each other. In addition, when the amplifying optical fiber is wound in a coil shape, a rotation axis of the bobbin and a rotation axis of the rotary jig are disposed to be non-parallel to each other.

According to this configuration, if the amplifying optical fiber drawn out from the bobbin is wound around the rotary jig in a state where the rotation axis of the bobbin and the rotation axis of the rotary jig are disposed to be non-parallel to each other, the amplifying optical fiber is twisted. Thereafter, the wound amplifying optical fibers are fixed to each other by the resin and are integrated. Accordingly, it is possible to easily manufacture the amplifying coil.

Effects of the Invention

According to the aspects, it is possible to provide the fiber laser apparatus having the amplifying coil which can sufficiently maintain the twisted state of the amplifying optical fiber and can be easily handled. According to the aspects, it is possible to provide a method of easily manufacturing an amplifying coil which can sufficiently maintain the twisted state of the amplifying optical fiber and can be easily handled.

DETAILED DESCRIPTION OF THE INVENTION

First Embodiment

Hereinafter, a fiber laser apparatus according to a first embodiment of the invention will be described with reference to FIGS. 1 to 7.

The fiber laser apparatus according to the embodiment includes an amplifying coil having a configuration in which an amplifying optical fiber including a core and a polygonal cladding is wound.

For example, the fiber laser apparatus according to the embodiment may be used for applications such as laser processing. However, the application is not limited to the laser processing.

Figure 1:
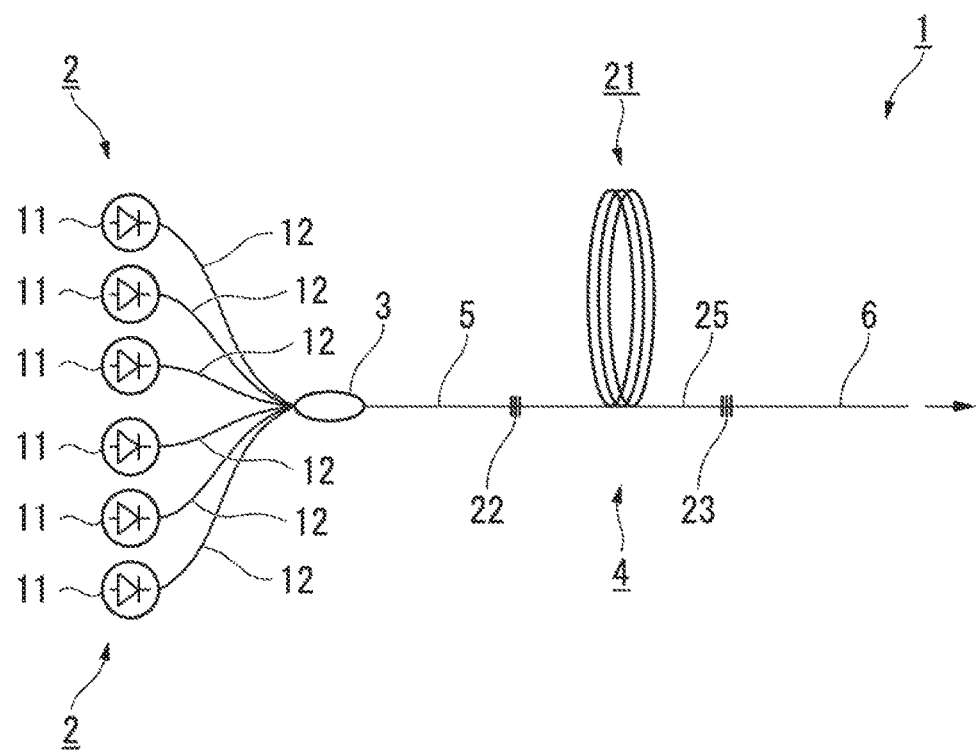
FIG. 1 is a schematic configuration view showing a fiber laser apparatus of a first embodiment of the invention.

FIG. 1 is a schematic configuration view showing the fiber laser apparatus of the embodiment.

In the following drawings, for easy understanding of each component, scales of dimensions may be different according to the components.

Configuration of Fiber Laser Apparatus

As shown in FIG. 1, a fiber laser apparatus 1 includes a pumping light source 2, an optical combiner 3, an optical resonator 4, an input side optical fiber 5, and a launching side optical fiber 6. The optical resonator 4 includes an amplifying, coil 21 configured of an amplifying optical fiber 25, a first reflector 22, and a second reflector 23. An input side optical fiber 5 is connected to one end of the amplifying optical fiber 25, and a launching side optical fiber 6 is connected to the other end of the amplifying optical fiber 25. The first reflector 22 is provided in the input side optical fiber 5 and the second reflector 23 is provided in the launching side optical fiber 6.

The pumping light source 2 is configured of a plurality of laser diodes 11 and launches pumping light. For example, as each of the laser diodes 11, a Fabry-Perot type semiconductor laser formed of a GaAs-based semiconductor material is used. The laser diodes 11 are connected to optical fibers 12, and the pumping light launched from the laser diodes 11 is propagated through the optical fibers 12 as multimode light, for example. The optical combiner 3 combines a plurality of pumping lights launched from the plurality of laser diodes 11 to generate one pumping light.

Configuration of Optical Resonator

Figure 2:
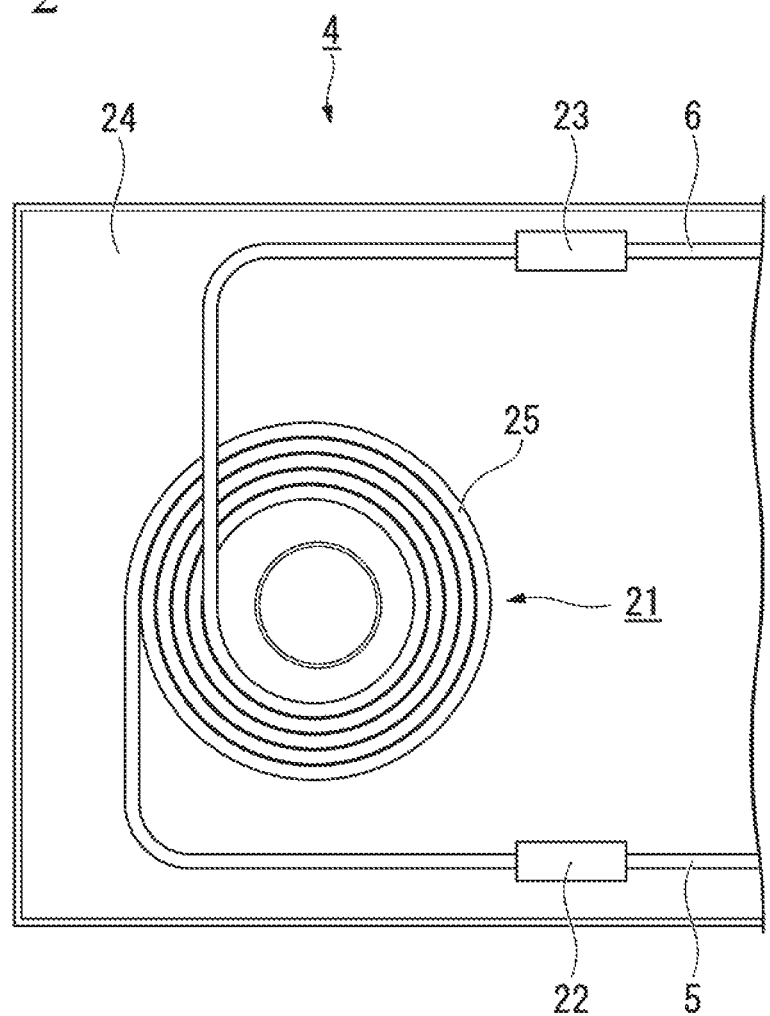
FIG. 2 is a plan view showing an optical resonator configuring the fiber laser apparatus.

FIG. 2 is a plan view showing the optical resonator 4 configuring the fiber laser apparatus 1.

As shown in FIG. 2, the optical resonator 4 includes the amplifying coil 21, the first reflector 22, the second reflector 23, and a water cooling plate 24. The amplifying coil 21 has a configuration in which the amplifying optical fiber 25 is wound. The amplifying optical fiber 25 of the embodiment includes a core which propagates the laser light and a noncircular cladding which propagates the pumping light, and is configured of a double clad fiber having two claddings.

The first reflector 22 is provided in a portion of the input side optical fiber 5 connected to the amplifying coil 21. The input side optical fiber 5 is connected to the outer end of the amplifying coil 21. The first reflector 22 reflects the laser light which is propagated through the amplifying optical fiber 25. The second reflector 23 is provided in a portion of the launching side optical fiber 6 connected to the amplifying coil 21.

The launching side optical fiber 6 is connected to the inner end of the amplifying coil 21. The second reflector 23 reflects part of the laser light which is propagated through the amplifying optical fiber 25. The laser light resonates between the first reflector 22 and the second reflector 23 and is amplified.

Each of the first reflector 22 and the second reflector 23 is configured of a fiber Bragg grating (FBG). The FBG is a reflector which forms a portion (grating) in which a refractive index is periodically changed in a longitudinal direction (light propagation direction) of the core. Accordingly, the FBG reflects only light having a specific wavelength corresponding to a period of the grating. A reflectance of the second reflector 23 is lower than a reflectance of the first reflector 22. As an example of a specific reflectance, preferably, the reflectance of the first reflector 22 is 90% or more, and more preferably, is 99% or more. For example, preferably, the reflectance of the second reflector 23 is 5 to 50%, and more preferably, is 5 to 10%.

The water cooling plate 24 has a flow path (not shown in figure) that allows cooling water to flow therethrough, and the cooling water is introduced into the flow path so that the water cooling plate 24 is cooled. The amplifying coil 21 the first reflector 22 and the second reflector 23 are mounted so as to be in contact with the surface of the water cooling plate 24, and are cooled by the water cooling plate 24. In addition, for example, parts such as the laser diode 11 (not shown in FIG. 2) are mounted on the water cooling plate 24, and the parts are also cooled by the water cooling plate 24.

The water cooling plate 24 of the embodiment may also be referred to as a cooling member.

The pumping light launched from the pumping light source 2 enters the amplifying optical fiber 25 via the input side optical fiber 5 and is absorbed by the core of the amplifying optical fiber 25. Accordingly, laser light is outputted from the core of the amplifying optical fiber 25, and the laser light resonates between the first reflector 22 and the second reflector 23 including the amplifying coil 21 so as to be amplified. The laser light amplified by the amplifying coil 21 is launched through the launching side optical fiber 6.

Configuration of Amplifying Coil

Figure 3:
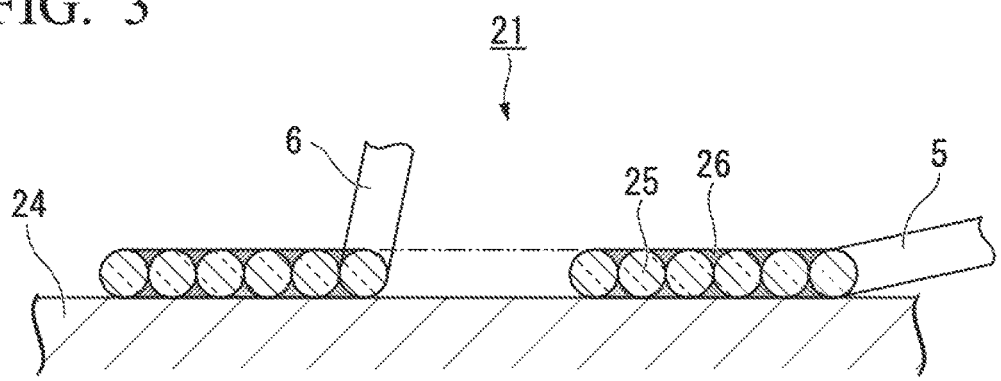
FIG. 3 is a cross-sectional view showing an amplifying coil configuring the optical resonator.

FIG. 3 is a cross-sectional view showing the amplifying coil 21 configuring the optical resonator 13.

As shown in FIG. 3, the amplifying coil 21 has a configuration in which the amplifying optical fiber 25 is wound in a plane shape. Thai is, the amplifying coil 21 is configured of the amplifying optical fiber 25 having one layer. A plurality of amplifying optical fibers 25 are not stacked in a direction perpendicular to a radial direction of the amplifying coil 21. Accordingly, the amplifying optical fiber 25 configuring the amplifying coil 21 is in contact with the water cooling plate 24 over the entire length in the longitudinal direction.

A portion between adjacent amplifying optical fibers 25 is filled with a resin 26. In FIG. 3, the configuration in which adjacent amplifying optical fibers 25 are in contact with each other is shown. However, instead of this configuration, there may be a gap between adjacent amplifying optical fibers 25. For example, as the resin, an ultraviolet curing type resin, a silicone rubber type resin, or the like is used. Since the portion between the adjacent amplifying optical fibers 25 is filled with the resin 26, the wound amplifying optical fibers 25 are fixed to and integrated with each other. In this way, the integrated amplifying optical fiber 25 configures the amplifying coil 21. As shown in FIG. 2, when the amplifying coil 21 is viewed in a plan view, the resin 26 is provided over the entire periphery of the amplifying coil 21.

Figure 4:
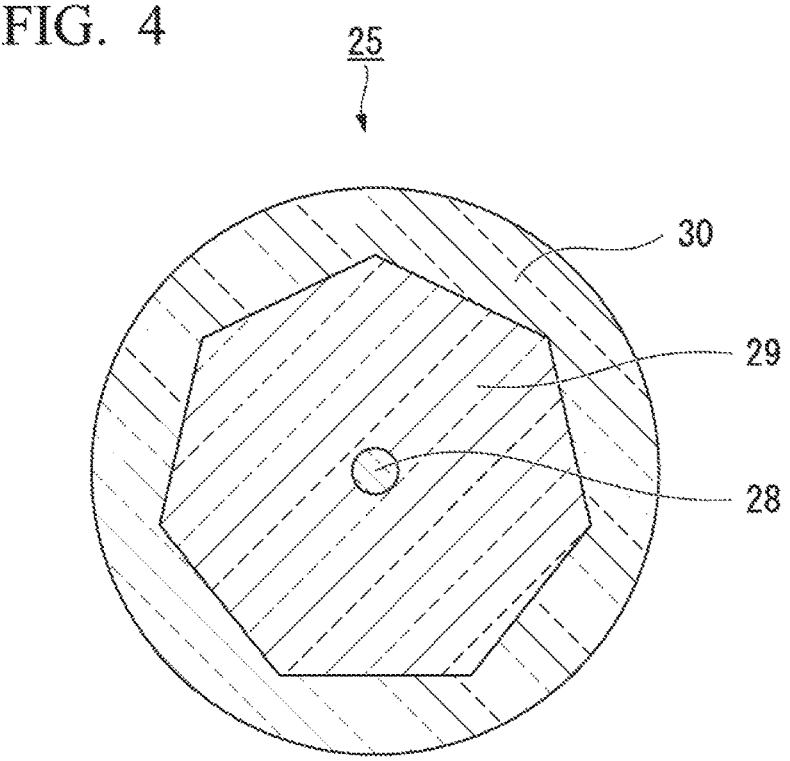
FIG. 4 is a cross-sectional view showing an amplifying optical fiber configuring the amplifying coil.

FIG. 4 is a cross-sectional view showing the amplifying optical fiber 25 configuring the amplifying coil 21.

The amplifying optical fiber 25 is configured of a double clad fiber having a core 28, a first cladding 29 which covers the outside of the core 28, and a second cladding 30 which covers the outside of the first cladding 29. The first cladding 29 is a polygonal cladding (noncircular cladding) having a regular heptagonal cross-sectional shape perpendicular to the center axis of the amplifying optical fiber 25.

In the amplifying optical fiber 25, the first cladding 29 is provided concentrically on the outside of the core 28 to which a rare earth element is added, and the second cladding, 30 having a regular heptagonal cross-sectional shape is provided outside the first cladding 29. In addition, a protective coating (not shown in figure) may be provided outside the second cladding 30. A rare earth element is added to the core 28 in addition to dopants which increase the refractive index. A rare earth element may be added to the entire core 28, and a rare earth element may be added to a portion of the core 28. A rare earth element may be added to a portion of the first cladding 29 in addition to the core 28. By increasing the refractive index of the core 28 to be higher than the refractive index of the first cladding 29, the core 28 and the first cladding 29 configures a waveguide structure. The oscillated laser light is guided by the waveguide structure. As examples of the dopant which increase the refractive index, there is Ge, Al, P, or the like. In addition, co-addition of these elements or co-addition of these elements with F, B, or the like may be performed.

The rare earth element added to the core 28 is determined according to a pumping wavelength, an amplification wavelength, and an oscillation wavelength. For example, Yb is used to obtain light having a wavelength of 1060 nm used in material processing. In addition, Tm, Bi, Cr, Ce, Nd, Eu, or the like may be added. In order to avoid up-conversion or to obtain a co-addition sensitizing effect, not only a single rare earth element but also a plurality of rare earth elements may be co-added. Similarly, Ge, Al, P, F, B, or the like, and co-addition of these are common as a dopant for controlling the refractive index. Moreover, Ti, Bi, Cl, or the like may be used as the dopant for controlling the refractive index. A dispersant for rare earth elements may also be added at the same time. In addition to the elements, Cr, Ga, In, As, Sb, or the like may be used as the dispersant.

In most cases, generally, a refractive index profile of the core 28 is referred to as a step type profile having a constant refractive index. However, various refractive index profiles such as a dual shape type profile, a segment core type profile, or a ring type profile may be adopted according to the requirement for optical characteristics of the core 28 determined by the refractive index profile of the core 28. In the embodiment, the fiber is exemplified in which the core 28, the first cladding 29, and the second cladding 30 are formed of a silica glass-based material. However, the invention is not limited to this.

Since an outline of the first cladding 29, that is, a shape of a boundary between the first cladding 29 and the second cladding 30 in the amplifying optical fiber 25 of the embodiment is a regular heptagon which is not twice symmetrical about the axis, light which is not guided by the cladding, does not reach the core, and does not contribute as pumping light, that is, so-called skew light can be suppressed. However, even though the cross-sectional shape of the first cladding 29 is formed into a polygon, the skew light still remains, and there is a concern that the utilization efficiency of the pumping light cannot be further improved. Therefore, in order to further decrease the skew light and further improve the utilization efficiency of the pumping light, in the embodiment, the amplifying optical fiber 25 is wound so as to be twisted in the peripheral direction with the center axis of the amplifying optical fiber 25 as a center.

A twist amount of the amplifying optical fiber 25 may be constant over the entire length of the amplifying coil 21. Alternatively, the twist amount of the amplifying optical fiber 25 may gradually increase in the direction from the first reflector 22 side toward the second reflector 23 side. Moreover, preferably, the twist amount of the amplifying optical fiber 25 is 3 turns/m or less.

Method of Manufacturing Amplifying Coil

Hereinafter, an example of a method of manufacturing the amplifying coil 21 having the above-described configuration will be described with reference to FIGS. 5A to 5E.

Figure 5A:
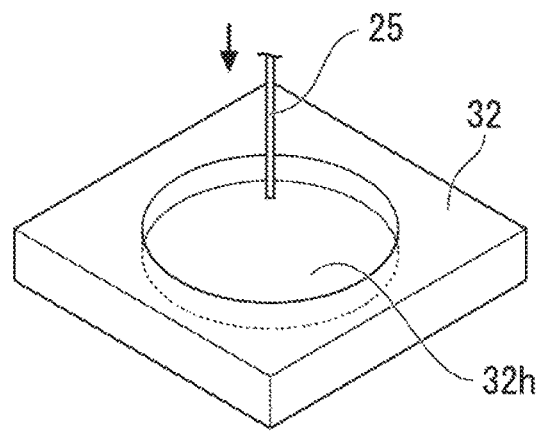
FIG. 5A is a process view showing a method of manufacturing an amplifying coil of a first embodiment.

As shown in FIG. 5A, a base 32 having a circular recessed portion 32*h* on one surface is prepared. The amplifying optical fiber 25 is supported by an arbitrary jig or device (not shown in figure), and one end of the amplifying optical fiber 25 is positioned above the recessed portion 32*h* of the base 32. In this state, one end of the amplifying optical fiber 25 is lowered onto a bottom surface of the recessed portion 32*h*. Thereafter, the position of the amplifying optical fiber 25 supported by a jig or the like is always set so as to be positioned above approximately the center of the recessed portion 32*h* in the vertical direction.

Figure 5B:
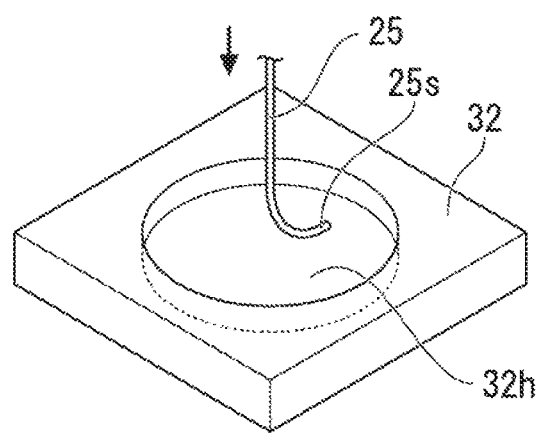
FIG. 5B is a process view showing the method of manufacturing an amplifying coil of the first embodiment.

If the amplifying optical fiber 25 is further lowered, as shown in FIG. 5B, after a distal end 25*s* of the amplifying optical fiber 25 comes into contact with the bottom surface of the recessed portion 32*h*, the amplifying optical fiber 25 moves to the outside of the recessed portion 32*h*.

Figure 5C:
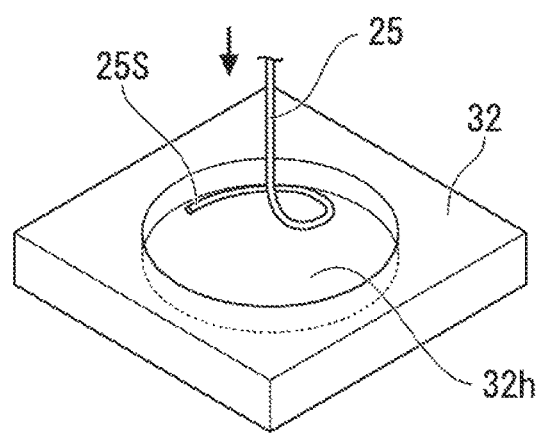
FIG. 5C is a process view showing the method of manufacturing an amplifying coil of the first embodiment.
Figure 5D:
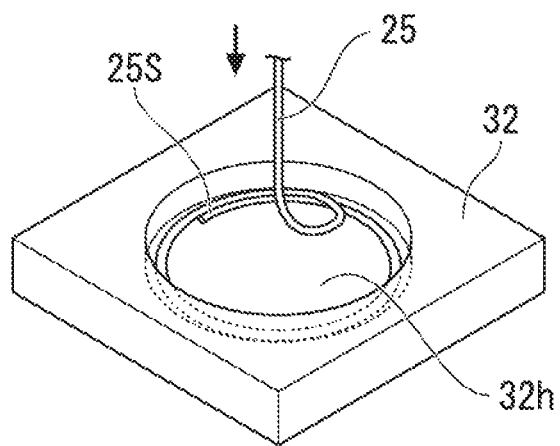
FIG. 5D is a process view showing the method of manufacturing an amplifying coil of the first embodiment.

If the amplifying optical fiber 25 is further lowered, as shown in FIG. 5D, the distal end 25*s* of the amplifying optical fiber 25 moves along a side wall of the recessed portion 32*h*, and the amplifying optical fiber 25 is circularly wound.

If the amplifying optical fiber 25 is further lowered, as shown in FIG. 5C, the winding of the amplifying optical fiber 25 enters from a first turn to a second turn. In this case, the distal end 25 of the amplifying optical fiber 25 collides with the amplifying optical fiber 25 on the outermost first turn. However, since the amplifying optical fiber 25 hanging from above the recessed portion 32*h* is rounded and curved, the distal end 25*s* of the amplifying optical fiber 25 enters the inside of the amplifying optical fiber 25 on the outermost first turn and becomes the second turn. By continuing this movement, the amplifying optical fiber 25 is wound in a coil shape. In this way, the amplifying optical fiber 25 is naturally twisted in the circumferential direction with the center axis as a center.

Thereafter, in order to maintain the state where the amplifying optical fiber 25 is wound and twisted in the peripheral direction, the amplifying optical fiber 25 may be temporarily fixed using a tape or the like.

Figure 5E:
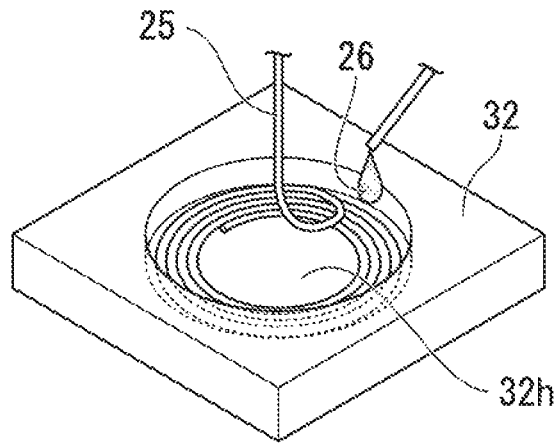
FIG. 5E is a process view showing the method of manufacturing an amplifying coil of the first embodiment.

Next, as shown in FIG. 5E, a liquid resin 26 is applied from above the amplifying optical fiber 25 wound in a coil shape, and a portion between the adjacent amplifying optical fibers is filled with the resin 26. For example, in a case of using an ultraviolet curing resin, after applying the resin 26, the resin 26 is cured by irradiating the resin 26 with ultraviolet rays. As a result, the wound amplifying optical fibers 25 are fixed and integrated with each other.

According to the above steps, the amplifying coil 21 of the embodiment is completed.

Figure 6:
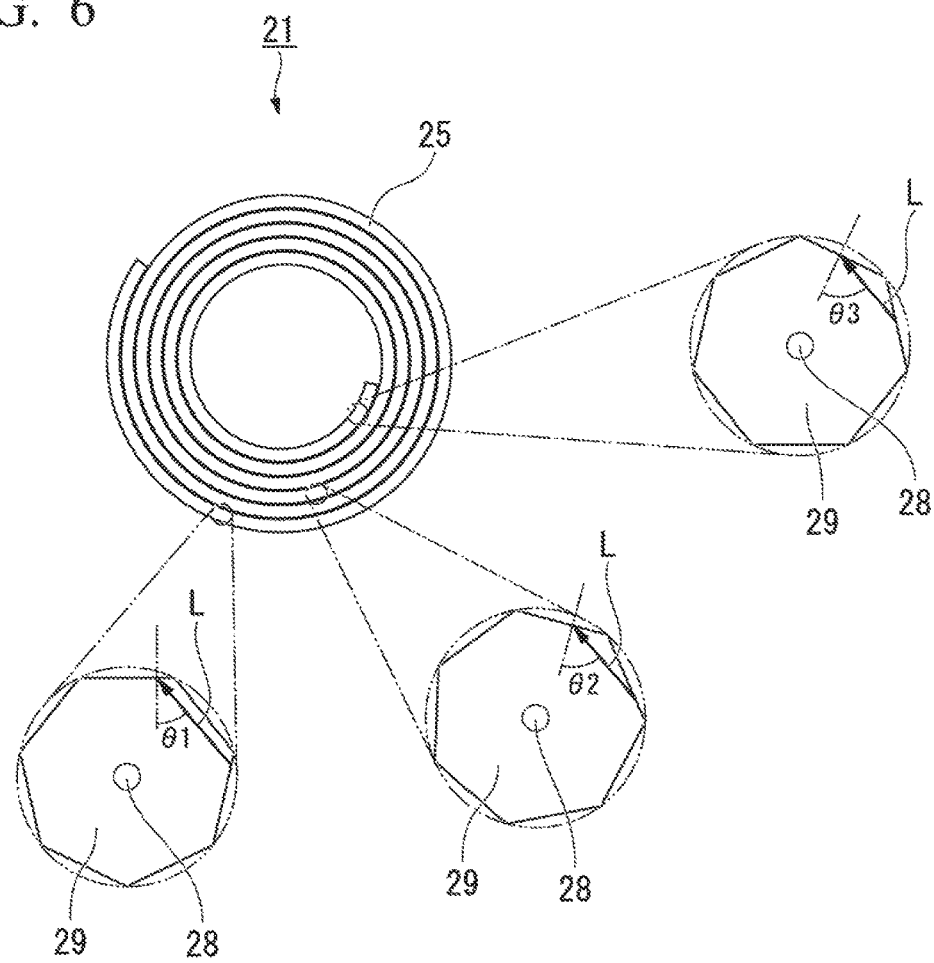
FIG. 6 is an explanatory view showing an operation of the amplifying coil.

FIG. 6 is an explanatory view showing the operation of the amplifying coil 21 of the embodiment and shows how pumping light travels at three different locations of the amplifying coil 21.

If the amplifying optical fiber is not twisted, skew light travels in the first cladding without changing an incident angle (reflection angle) with respect to the interface between the first cladding and the second cladding. Therefore, the skew light remains as skew light no matter how far it goes.

In contrast, in the embodiment, since the amplifying optical fiber 25 is twisted, the direction of the regular heptagon, which is the outline shape of the first cladding 29, varies according to the location of the amplifying optical fiber 25. Accordingly, as shown in FIG. 6, incident angles $\theta1$, $\theta2$, $\theta3$ (reflection angle) of skew light L is changed according to the locations. That is, $\theta1 \neq \theta2 \neq \theta3$. Due to the change in the incident angle and the reflection angle, the skew light L passes through the core 28 while traveling in the first cladding 29 and contributes as pumping light. Accordingly, it is possible to increase the utilization efficiency of the pumping light, and it is possible to increase power of output light.

Moreover, in the case of the embodiment, as shown in FIG. 3, the surface of the amplifying coil 21 is flattened by embedding the portion between the adjacent amplifying optical fibers 25 with the resin 26. Accordingly, a contact area between the amplifying coil 21 and the water cooling plate 24 increases as compared with a case where the portion between the adjacent amplifying optical fibers is not filled with resin. As a result, the amplifying coil 21, which easily rises in temperature during laser oscillation, is sufficiently cooled, and it is possible to decrease characteristic fluctuation due to temperature drift. In this way, according to the amplifying coil 21 of the embodiment, since the amplifying optical fiber 25 is integrated with the resin 26, the amplifying optical fiber 25 can be easily handled without being dispersed and is also excellent in terms of characteristics.

In addition, it is not necessarily favorable to increase the twist amount of the amplifying optical fiber 25. That is, if the twist amount of the amplifying optical fiber 25 is too large, there arises a problem that beam quality deteriorates. With respect to this, in the embodiment, the twist amount of the amplifying optical fiber 25 is limited to 3 turns/m or less, so that deterioration of the beam quality, specifically, an increase in the $M^2$ value can be prevented. The $M^2$ value is an index quantitatively indicating the deviation from the Gaussian beam and shows how many times the beam can be focused by the diffraction limit.

The inventors examined a relationship between the twist amount of the amplifying optical fiber and the change in the $M^2$ value. The results are shown below.

Figure 7:
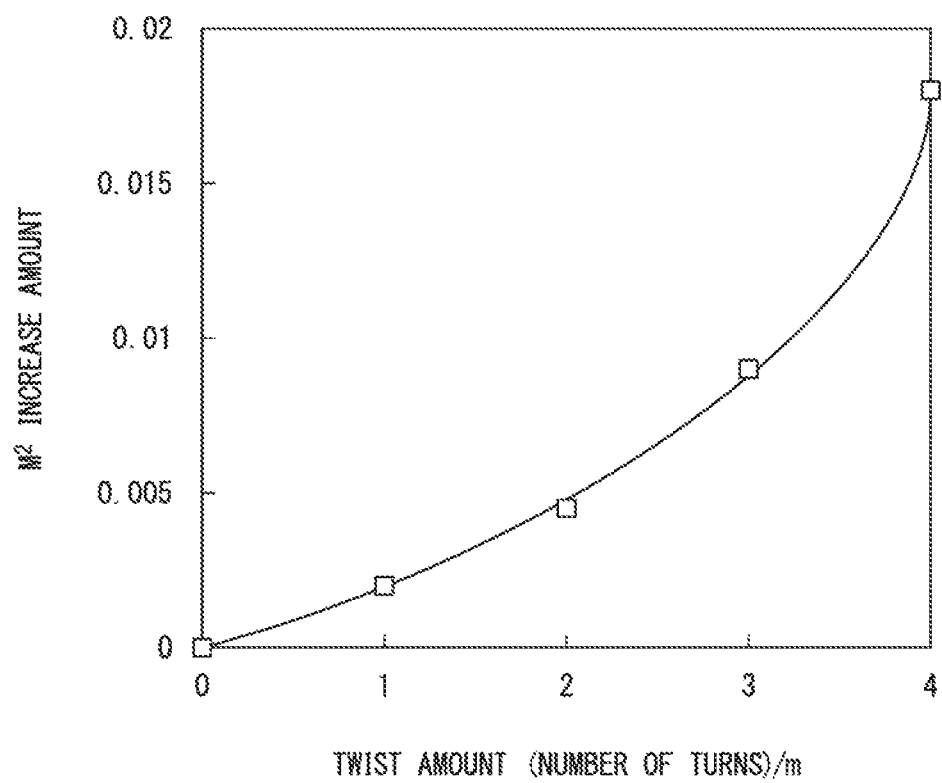
FIG. 7 is a graph showing a relationship between a twist amount and an increase amount of $M^2$ of the amplifying optical fiber.

FIG. 7 is a graph showing the relationship between the twist amount and an increase amount of $M^2$ of the amplifying optical fiber. In FIG. 7, a horizontal axis represents the twist amount (the number of turns in the circumferential direction in the cross section perpendicular to the center axis of the amplifying optical fiber) per 1 m of the amplifying optical fiber, and the vertical axis of FIG. 7 represents the increase amount of $M^2$ relative to the $M^2$ value when the amplifying optical fiber is not twisted.

As shown in FIG. 7, as the twist amount per 1 m of the amplifying optical fiber increases, the increase amount of $M^2$ has a tendency to rapidly increase. From this graph, if the twist amount per 1 m of the amplifying optical fiber is 3 turns or less, the increase amount of the $M^2$ is 0.01 or less. Since an ideal value of the $M^2$ value is 1, if the increase amount of the $M^2$ is 0.01 or less, an increment of the $M^2$ value as a ratio to the ideal value becomes 1% or less, and it is determined that it is stable as the beam quality.

As described above, the twist amount of the amplifying optical fiber 25 may not be constant, and the twist amount of the portion of the amplifying optical fiber 25 close to the second reflector 23 may be larger than the twist amount of the portion of the amplifying optical fiber 25 close to the first reflector 22. That is, the twist amount on the launching side of the amplifying optical fiber 25 may be larger than the twist amount on the input side of the amplifying optical fiber 25. Generally, in the amplifying optical fiber, the pumping light is largely absorbed by the core mainly on the input side (the first reflector side), and many skew light components are likely to be gradually generated in the direction toward the launching side (the second reflector side). With respect to this, according to the above configuration, since the twist amount of the amplifying optical fiber 25 gradually increases in the direction from the first reflector 22 side toward the second reflector 23 side, the skew light component is easily absorbed by the core on the launching side. Accordingly, it possible to prevent the deterioration of the beam quality of the amplifying optical fiber 25 while decreasing local heat generation and it is possible to increase the utilization efficiency of the pumping light.

Second Embodiment

Hereinafter, a fiber laser apparatus according to a second embodiment of the invention will be described with reference to FIG. 8.

The configuration of the fiber laser apparatus according to the second embodiment is similar to that of the fiber laser apparatus of the first embodiment, and a method of manufacturing the amplifying coil is different from that of the first embodiment. Therefore, hereinafter, the method of manufacturing the amplifying coil according to the embodiment will be described.

Figure 8:
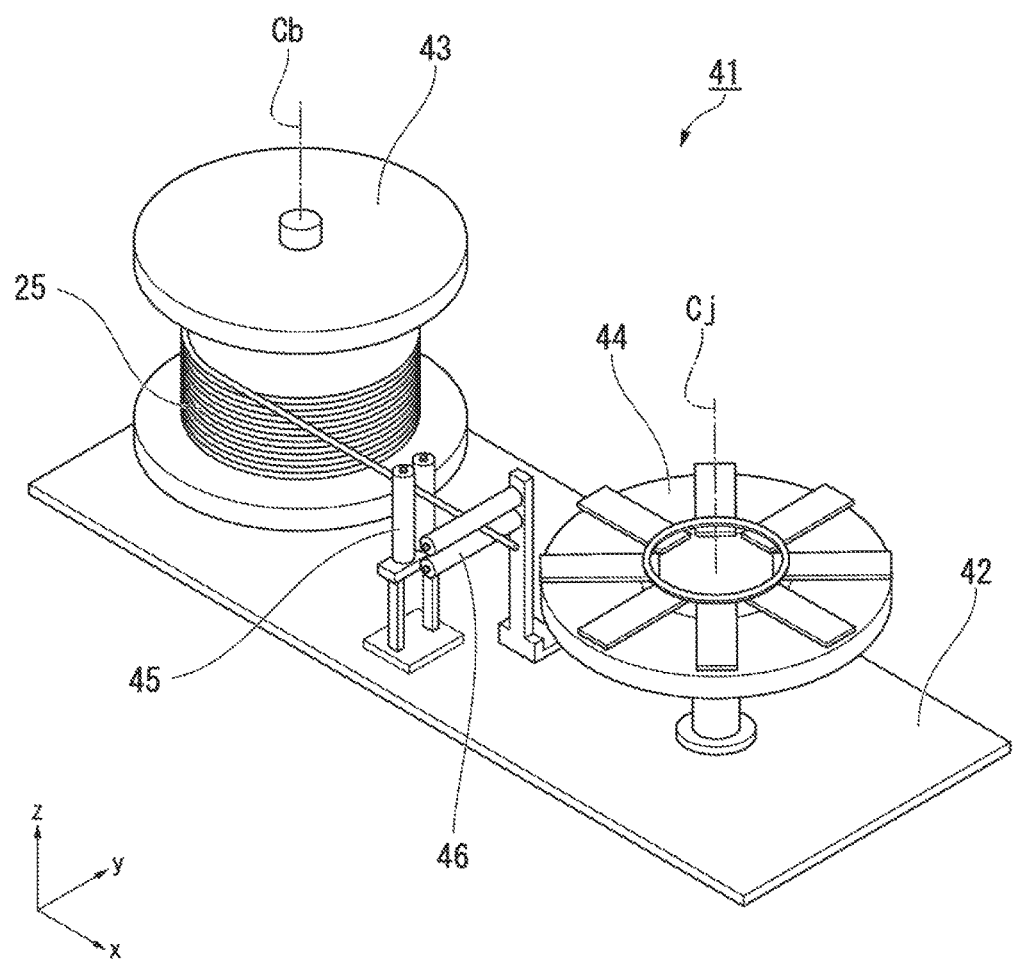
FIG. 8 is a perspective view showing a coil automatic winding apparatus which is used in a method of manufacturing an amplifying coil of a second embodiment.

FIG. 8 is a perspective view showing a coil automatic winding apparatus used in the method of manufacturing the amplifying coil of the embodiment.

In FIG. 8, a direction in which a bobbin and a rotary jig are arranged is defined as an x axis direction, a direction orthogonal to the arrangement direction of the bobbin and the rotary jig is defined as a y axis direction, and a height direction (vertical direction) of the cod automatic winding apparatus is a z axis direction.

As shown in FIG. 8, a coil automatic winding apparatus 41 includes a base 42, a bobbin 43, a rotary jig 44, a first fiber guide roller 45, and a second fiber guide roller 46.

The base 42 supports members such as the bobbin 43, the rotary jig 44, the first fiber guide roller 45, the second fiber guide roller 46, or the like. The amplifying optical fiber 25 is wound around the bobbin 43 before the amplifying coil 21 is manufactured. The rotary jig 44 is used so as to wind the amplifying optical fiber 25 drawn out from the bobbin 43 to manufacture the amplifying coil 21. The first fiber guide roller 45 and the second fiber guide roller 46 support the amplifying optical fiber 25 between the bobbin 43 and the rotary jig 44.

The bobbin 43 and the rotary jig 44 are configured so as to be automatically rotated by a drive source (not shown in figure) such as a motor. In addition, a rotation axis Cb of the bobbin 43 and a rotation axis Cj of the rotary jig 44 are disposed so as to be parallel to each other before the start of winding in a plane (in an yz plane) orthogonal to an arrangement direction of the two rotation axes Cb and Cj.

First, the bobbin 43 around which the amplifying optical fiber 25 is wound is set in the coil automatic winding apparatus 41.

Next, the distal end of the amplifying optical fiber 25 is drawn out and connected to the rotary jig 44 via the first fiber guide roller 45 and the second fiber guide roller 46.

Next, a power switch of the coil automatic winding apparatus 41 is turned on. Accordingly, the bobbin 43 and the rotary jig 44 are automatically rotated, and the amplifying optical fiber 25 is wound from the inside of the rotary jig 44 toward the outside thereof. In this case, as the twist angle between the rotation axis Cb of the bobbin 43 and the rotation axis Cj of the rotary jig 44 is gradually increased in the direction from the start of winding, the rotation axis Cb of the bobbin 43 and the rotation axis Cj of the rotary jig 44 are in a twisted positional relationship. Therefore, the amplifying optical fiber 25 is wound around the rotary jig 44 while being twisted in the peripheral direction with its own center axis as a center.

Next, in order to maintain the state in which the amplifying optical fiber 25 is twisted and wound, the amplifying optical fibers 25 are temporarily fixed to each other using a tape.

Next, the rotary jig 44 is removed from the amplifying optical fiber 25 in the wound state.

Next, a silicone rubber type resin is applied to the wound amplifying optical fiber 25, and a portion between the adjacent amplifying optical fibers 25 is filled with resin. After applying the resin, it is allowed to stand for a predetermined time to cure the resin. As a result, the wound amplifying optical fibers 25 are fixed and integrated with each other.

According to the above steps, the amplifying coil 21 is completed,

Also in the embodiment, it is possible to provide a fiber laser apparatus having an amplifying coil which is easy to handle and has excellent characteristics, and it is possible to obtain the effects similar to those of the first embodiment. Moreover, in the case of the embodiment, in order to manufacture the amplifying coil 21 using the coil automatic winding apparatus 41, it is possible to control the twist amount of the amplifying optical fiber 25 by adjusting a twist angle between the rotation axis Cb of the bobbin 43 and the rotation axis Cj of the rotary jig 44. For example, as the twist angle between the rotation axis Cb of the bobbin 43 and the rotation axis Cj of the rotary jig 44 is gradually increased in the direction from the start of winding, it is possible to manufacture a coil in which the twist amount of the amplifying optical fiber 25 from the inside toward the outside gradually increases. In this case, the inside of the coil may be connected to the first reflector side (input side) and the outside of the coil may be connected to the second reflector side (launching side).

In addition, the technical scope of the invention is not limited to the above embodiments, and various modifications can be applied within a scope which does not depart from the scope of the invention.

Figure 9:
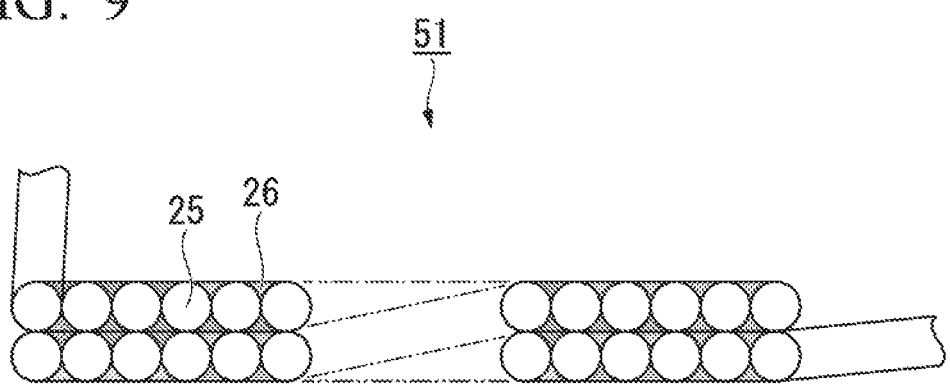
FIG. 9 is a cross-sectional view showing a modified example of the amplifying coil.

For example, in the above embodiments, an example of an amplifying coil including a single layer of amplifying optical fibers wound in a plane shape is shown. Instead of this configuration, although heat radiation property of the coil is inferior, for example, as shown in FIG. 9, an amplifying coil 51 in which a plurality of amplifying optical fibers 25 are stacked in a direction perpendicular to the radial direction may be used.

In the above embodiment, an example of a configuration in which a resin is provided over the entire periphery of the amplifying coil is shown. Instead of thin configuration, the resin need not necessarily be provided over the entire periphery of the amplifying coil, or may be provided in only a partial region obtained by dividing the amplifying coil in the peripheral direction. For example, this configuration can be realized by a process of temporarily fixing the wound amplifying optical fiber with a tape, applying a resin to a region other than the region covered with the tape, curing the resin, and, thereafter, separating the tape.

In addition, in the above-described embodiments, the example in which the adjacent amplifying optical fibers are fixed and integrated with each other by using a resin is described. However, instead of this configuration, for example, the amplifying optical fiber may be fitted into the groove of the jig using the jig having a coil-shaped groove so that the amplifying optical fibers are fixed and integrated with each other. That is, the adjacent amplifying optical fibers may be fixed via other members, and the amplifying optical fibers may not necessarily be fixed and integrated with each other.

In addition, the specific description concerning the shape, size, arrangement, material, or the like of each component of the fiber laser apparatus is not limited to the above embodiments, and can be appropriately modified.

What is claimed is:

1. A fiber laser apparatus, comprising:
   a pumping light source which launches pumping light;
   an amplifying optical fiber which includes a core and a noncircular cladding, and absorbs the pumping light to launch laser light;
   an amplifying coil which has a configuration around which the amplifying optical fiber is wound;
   a first reflector which is provided on an input side of the amplifying coil and is configured to reflect the laser light toward the amplifying coil; and
   a second reflector which is provided on a launching side of the amplifying coil, has a lower reflectance than a reflectance of the first reflector, and is configured to reflect the laser light toward the amplifying coil;
   wherein in the amplifying coil, the amplifying optical fiber is wound with a center axis of the amplifying optical fiber as a center in a state of being twisted in a peripheral direction of the amplifying optical fiber, and the wound amplifying optical fiber is fixed and integrated,
   wherein a twist amount of the amplifying optical fiber gradually increases in a direction from the first reflector side toward the second reflector side, and
   wherein the twist amount is number of turns of the amplifying optical fiber around a longitudinal axis of the amplifying optical fiber per unit length of the amplifying optical fiber.

2. The fiber laser apparatus according to claim 1,
   wherein in the amplifying coil, a portion between adjacent amplifying optical fibers is filled with a resin.

3. The fiber laser apparatus according to claim 1, further comprising:
   a cooling member which cools the amplifying coil.

4. The fiber laser apparatus according to claim 1,
   wherein the twist amount of the amplifying optical fiber is 3 turns/m or less.

5. A method of manufacturing an amplifying coil, comprising:
   winding an amplifying optical fiber in a coil shape while lowering a portion of the amplifying optical fiber onto a bottom surface of a circular recessed portion of a base by:
   moving the amplifying optical fiber to the outer side of the recessed portion by lowering the portion of the amplifying optical fiber after a distal end of the amplifying optical fiber comes into contact with the bottom surface of the recessed portion,
   moving the distal end of the amplifying optical fiber along a side wall of the recessed portion by further lowering the portion of the amplifying optical fiber to wind the amplifying optical fiber circularly,
   causing the distal end of the amplifying optical fiber to collide with the amplifying optical fiber on the outermost first turn by further lowering the portion of the amplifying optical fiber to cause the distal end of the amplifying optical fiber to enter the inside of the amplifying optical fiber on the outermost first turn such that the amplifying optical fiber is twisted around a longitudinal axis of the amplifying optical fiber; and
   filling a portion between adjacent amplifying optical fibers with a resin to fix the amplifying optical fibers to each other.

6. A method of manufacturing an amplifying coil, comprising:
   winding an amplifying optical fiber drawn out from a bobbin around a rotary jig while the amplifying optical fiber being twisted around a longitudinal axis of the amplifying optical fiber to wind the amplifying optical fiber in a coil shape; and
   filling a portion between adjacent amplifying optical fibers with a resin to fix the amplifying optical fibers to each other, wherein when the amplifying optical fiber is wound in a coil shape, a rotation axis of the bobbin and a rotation axis of the rotary jig are disposed to be non-parallel to each other, and the rotation axis of the bobbin and the rotation axis of the rotary jig are disposed to be non-parallel to each other so that the amplifying optical fiber is wound around the rotary jig while being twisted around the longitudinal axis of the amplifying optical fiber.

7. The method of manufacturing the amplifying coil according to claim 5, wherein after a distal end of the amplifying optical fiber comes into contact with the bottom surface, the distal end moves toward a side wall of the recessed portion.

\* \* \* \* \*